June 10, 1952  F. WAGUESPACK  2,599,677
LOADER
Filed Aug. 9, 1946  3 Sheets-Sheet 1
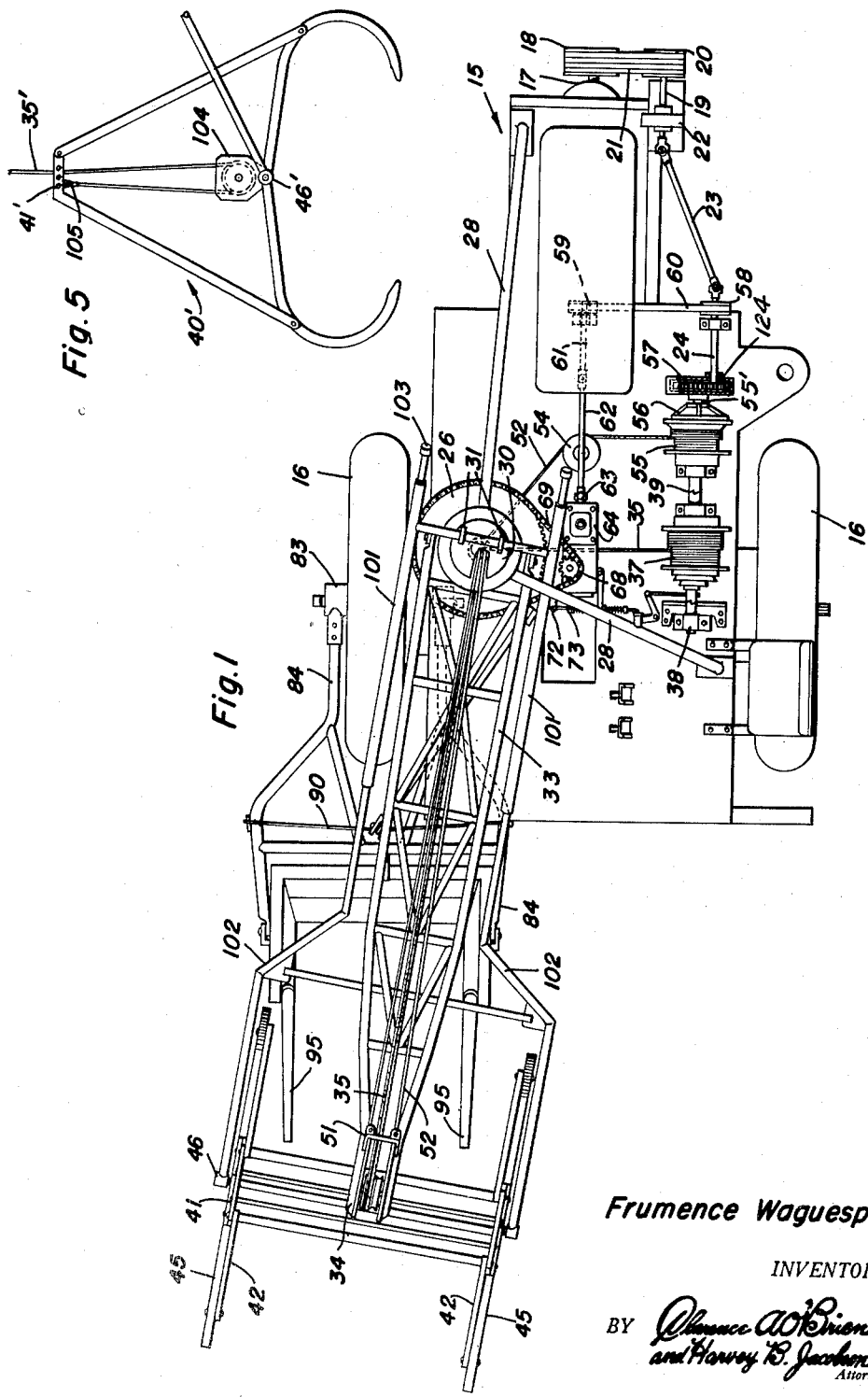
Frumence Waguespack
INVENTOR.

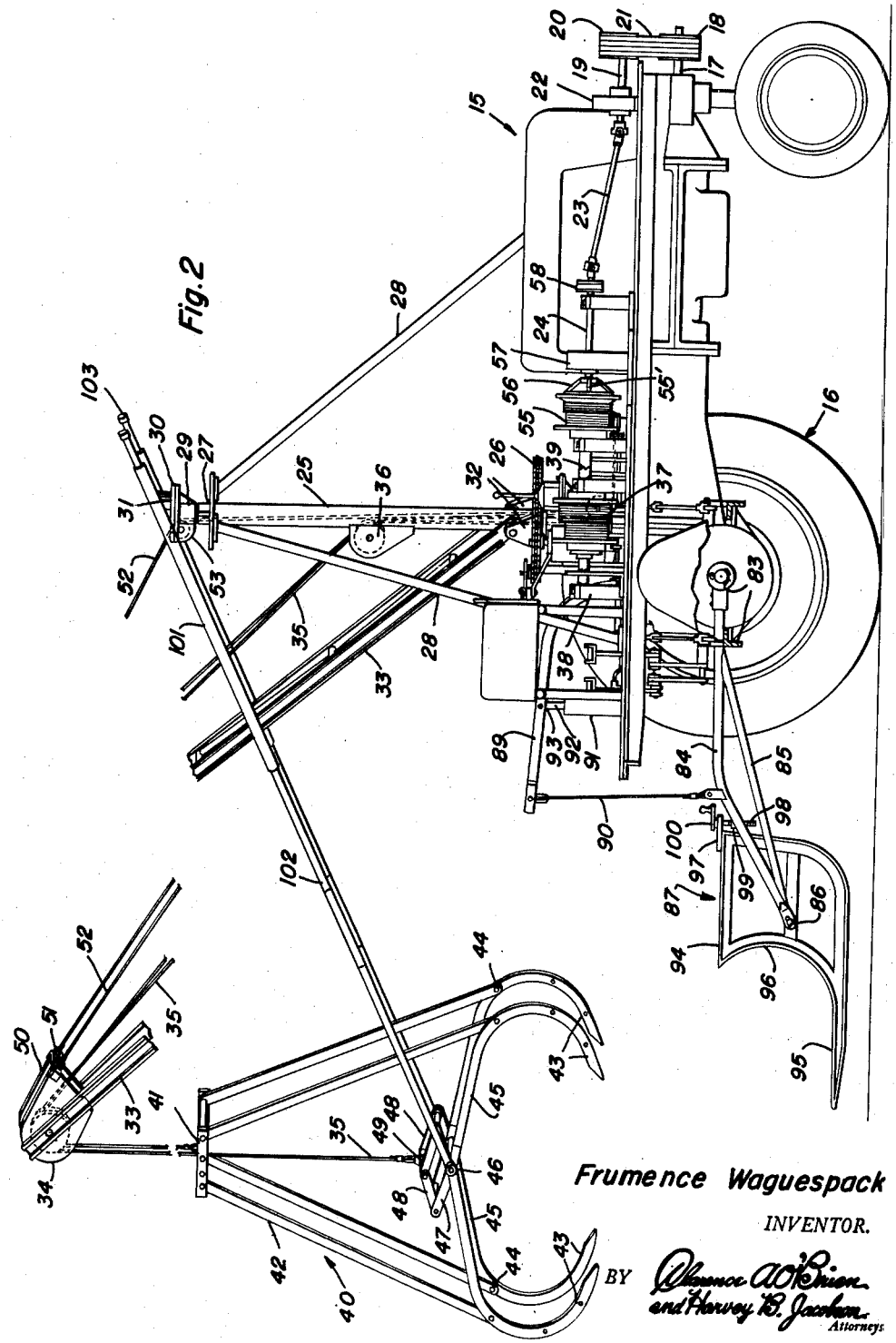

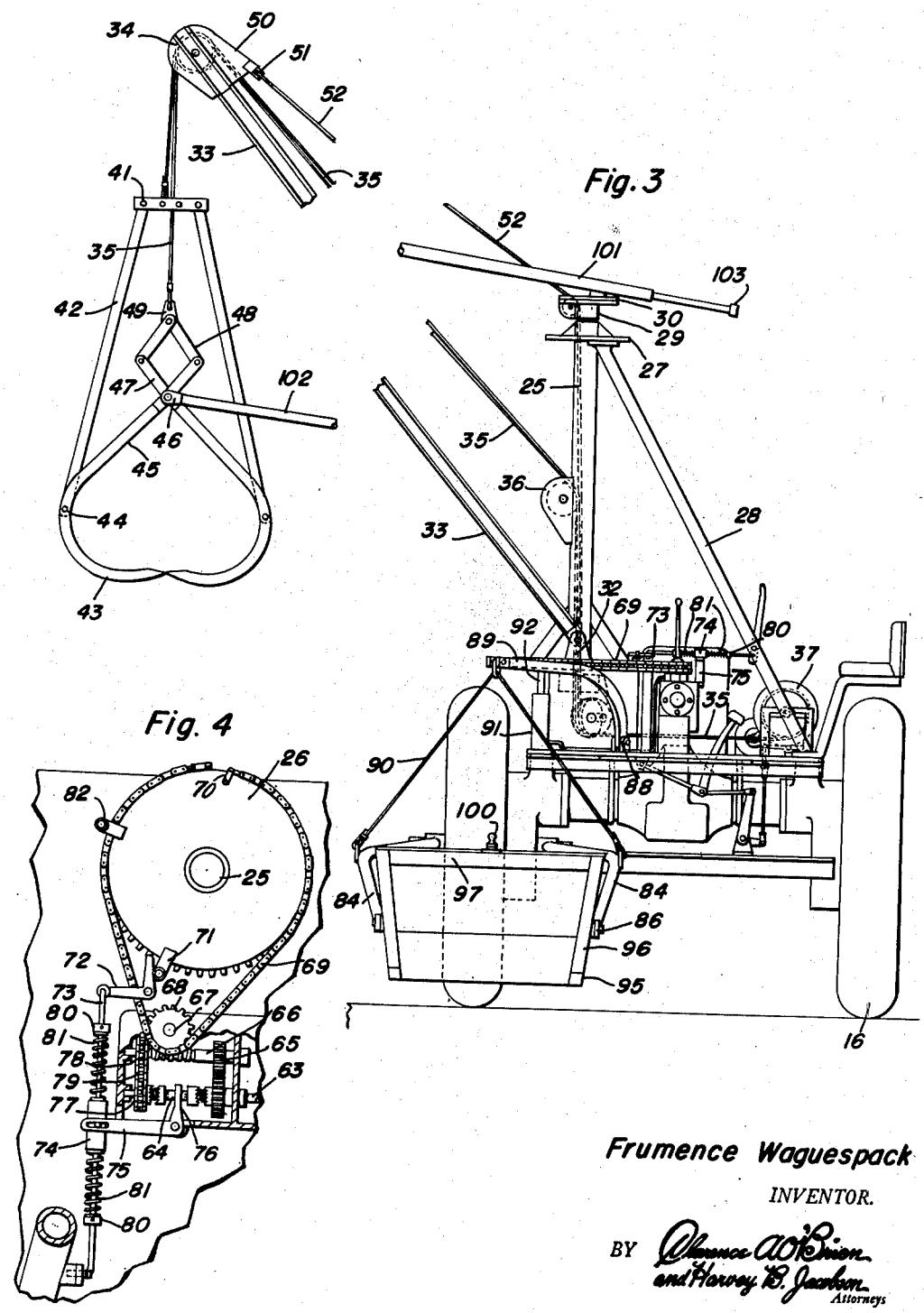

Patented June 10, 1952

2,599,677

UNITED STATES PATENT OFFICE 2,599,677

LOADER

Frumence Waguespack, Burnside, La.

Application August 9, 1946, Serial No. 689,453

6 Claims. (Cl. 212—42.5)

1

This invention relates to a loader, and has for its primary object to load stalk material such as cane stalks, corn stalks and the like.

Another object is to gather cut stalks from the ground and assemble them into a bundle which may be readily removed and deposited in a suitable conveyance such as a wagon, truck or the like.

Another object is to bundle a group of stalks, and deliver them to one side of the bundling scoop so that the process may function continuously with the unloading of the bundling scoop taking place as the scoop advances toward a group of stalks to collect and bundle them.

Among its features my invention embodies a scoop adapted to be advanced toward a group of cut stalks to collect the stalks into a bundle, means to remove bundled stalks from the scoop and means to advance the scoop horizontally toward the group of stalks.

Other features include means to advance the scoop horizontally toward the group of stalks and means to regulate the angle at which the scoop attacks the group of stalks.

Still other features include a grab to remove bundled stalks from the scoop and means to steady the grab and guide it into bundle removing position with relation to the scoop.

In the drawings:

Figure 1 is a plan view of a machine embodying the features of this invention;

Figure 2 is a side view of the machine shown in Figure 1 showing the boom lowered and the grab in open position;

Figure 3 is an end view of the device showing the grab elevated and in closed bundle sustaining position, with the boom turned into a position perpendicular to that illustrated in Figure 1;

Figure 4 is a detail view of the mast and turning means therefor;

Figure 5 is an enlarged detail view of a modified form of grab.

Referring to the drawings in detail a farm tractor designated generally 15 is equipped with the customary traction wheels 16 and power takeoff 17 to which a drive pulley 18 is fixed in a conventional manner. Mounted in suitable bearings (not shown) is a jack shaft 19 carrying at one end a drive pulley 20 having driving connection with the pulley 18 through the medium of an endless belt 21. The jack shaft 19 is connected through the medium of a suitable clutch 22 and a propeller shaft 23 the rotation of which is controlled by the clutch 22 to a drive shaft

2

24 mounted on the chassis of the tractor 15 intermediate its ends.

Mounted for rotation about a vertical axis on the chassis of the tractor 15 near the rear end thereof is a mast 25 carrying adjacent its lower end a disc 26 the purpose of which will more fully hereinafter appear. The upper end of the mast 25 is rotatably supported in a suitable bearing 27 rigidly supported in place by convergent supporting rods 28, the lower ends of which are attached to the chassis of the tractor in any conventional manner. A sleeve 29 surrounds the upper end of the mast 25 and carries at its upper end a bearing plate 30 from the upper surface of which project spaced parallel ears 31 the purpose of which will more fully hereinafter appear. Pivotally supported on a pair of upstanding brackets 32 carried by the plate 26 adjacent the base of the mast 25 is a boom 33 the free end of which is equipped with a suitable guide pulley 34 and over which is trained a cable 35, one end of which is trained over a guide pulley 36 carried by the mast and bent downwardly through the interior of the mast to a winding drum 37 mounted in suitable bearings 38 carried by the chassis of the tractor. This winding drum 37 has driving connections with the drive shaft 24 through the medium of a conventional clutch and reversing mechanism 39, so that the cable 35 may be wound on the drum 37 or unwound therefrom according to its direction of rotation.

Attached to the end of the cable 35 opposite that which is attached to the drum 37 is a grab designated generally 40 comprising a cross-member 41 to each of the opposite ends of which is pivoted a pair of spaced links 42 which are arranged to swing in spaced parallel arcs. A pair of grab hooks 43 is pivoted as at 44 to the ends of the links 42 opposite those pivoted to the cross-member 41 and each of the grab hooks 43 is provided with a lever arm 45. These lever arms extend toward one another and are pivoted together as at 46. Extensions 47 project from the lever arms 45 and are connected by links 48 to the cable 35 at 49 so that as pull is exerted on the cable the hooks 43 will be moved into closed position as illustrated in Figure 3.

Attached to the housing 50 which surrounds the pulley 34 as at 51 is a cable 52 which is trained over a pulley 53 carried at the top of the mast 25, and extends down through the mast and bent across a suitable guide pulley 54 to a winding drum 55 mounted in axial alignment with the drum 37 previously referred to. The drum 55 is loosely mounted on an axial shaft 55' which extends through the clutch 39 and drum 37, and keyed or otherwise attached to the shaft is a friction clutch 56 through the medium of which driving connection is established between the shaft and the drum 55. An internal ring gear 57 is secured to one end of the shaft and is driven through the medium of a pinion 124 attached to the drive shaft 24 so that when the power take-off of the tractor is operated, the shaft 24 and the axial shaft extending between the drums will be rotated.

Secured to the drive shaft 24 adjacent the end opposite the pinion which drives the ring gear 57 is a pulley 58 having driving connection with a pulley 59 through the medium of a belt 60, which pulley 59 is attached to the end of a jack shaft 61 coupled through the medium of a propeller shaft 62 to a drive shaft 63. The shaft 63 is connected through the medium of a clutch 64 (Figure 4) with a pinion 65 driving a worm shaft 66 which in turn drives a worm gear mounted on a vertical spindle 67 carrying a drive pulley or sprocket 68 about which a flexible member 69 is trained. This flexible member encircles the disc 26 and is anchored at 70 to the disc 26 so that when the sprocket 68 is rotated the disc 26 will be driven, thereby rotating the mast 25. A stop 71 is carried by the disc 26 and is adapted to actuate a rock arm 72 in the shape of a bell crank by means of which a plunger rod 73 which is slidably mounted in a sleeve 74 connected to one end of a lever 75, a forked end 76 of which is arranged to engage the clutch 64 so that when the lever 75 is moved the clutch will be shifted into driving position with the gear 65. In order to effect rotation of the spindle 67 in a reverse direction a pulley 77 is rotatably supported on the shaft 63 and has driving connection with a pulley 78, carried by the worm shaft 66 to which the pinion 65 is attached, through the medium of an endless belt 79. The pulley 77 is arranged to be driven when the clutch 64 is in one position and when the clutch is in shifted position it engages the pinion which meshes with the pinion 65 as will be readily understood upon reference to Figure 4. Adjustably attached to the rod 73 on opposite sides of the sleeve 74 are collars 80, and encircling the rod 73 between the collars 80 and opposite ends of the sleeve 74 are compression coil springs 81 which yieldingly urge the lever 75 to move under the influence of the rod 73. A second stop 82 is carried by the plate 26, so that when the plate is moved in a counter-clockwise position when viewed from Figure 4, the stop 82 will engage the arm 72 to alter the position of the clutch 64. In this way it is obvious that the mast 25 with the boom 33 may be swung through an arc of varying degrees which in the present instance is limited to 90 degrees as will be readily understood upon reference to Figures 2 and 3.

Pivotally supported at 83 (Figures 1 and 2) on the drive axle of the tractor, to swing about the axis thereof is a pair of spaced arms 84 which project rearwardly from the tractor and are provided with brace bars 85. The rear ends of these arms inclined downwardly as illustrated, and pivoted to swing about a horizontal axis between the arms 84 as at 86 is a scoop designated generally 87. Pivotally supported at 88 to the frame of the tractor is a lever 89 the free end of which is connected through the medium of a link 90 with the arms 84, and mounted on the frame of the tractor is the cylinder 91 of a hydraulic jack, the piston rod 92 of which is pivotally connected as at 93 to the lever 89 so that by operating the jack 92, the arms 84 may be swung about their pivots 83 as will be readily understood upon reference to Figure 2.

The scoop 87 previously referred to comprises a pair of side frames 94 provided with forward extensions 95 terminating at their rear ends in bundle forming arcuate guides 96 against which the stalks to be loaded are pressed as the scoop is advanced.

In order to alter the tilt of the scoop 87 about its pivotal support 86 I attach to each side member 94 thereof a rearwardly extending plate 97 in which is rotatably mounted a vertically extending screw threaded shaft 98 which enters an internally screw threaded nut 99 carried by its respective arm 84. A crank handle 100 is attached to the upper end of each shaft 98 so that by rotating the crank handles the shafts 98 will be rotated thereby moving the scoop 87 about the pivot 86, for the purpose of regulating the angle of attack of the scoop toward the group of stalks.

In order to lend rigidity to the boom 33 and prevent side sway of the grab 40 a tubular guide 101 is pivotally supported between each pair of ears 31, and slidably mounted in each tubular guide 101 is a guide rod 102, the forward end of each of which is pivoted to the pivot 46 adjacent its respective side of the grab 40. Fixed at the opposite end of each guide rod 102 is a stop 103 which when the grab is lowered engages the end of its respective tubular guide 101 to stop outward movement of the grab and swing it into proper position over the scoop, to lift the contents thereof when pull is exerted on the cable 35.

In Figure 5 I have illustrated a modified form of grab in which a guide cable 35' operating in the same manner as cable 35 is led downwardly over a guide pulley 104 carried by the pivot 46' which corresponds in all respects to the pivot 46 previously described. The end of the cable 35' opposite that trained over the pulley 104 is anchored at 105 to the cross-member 41' of the grab designated generally 40' so that when pull is exerted on the cable 35' the grab arms will be moved to closed position.

In use it will be understood that with the device attached to the tractor, the tractor is driven in reverse to cause the scoop 87 to advance toward the stalks to be bundled. The guides 95 will ride underneath the stalks against the surface upon which they rest and cause them to roll up against the guides 96 into a substantially circular bundle whereupon the operator manipulates the clutch 39 to set in motion the winding drum 37 in a direction to pay out the cable 35 and thus lower the grab 40 toward the bundled stalks. The tubular guides 101 in conjunction with the sliding rods 102 will guide the grab into proper position over the bundled stalks whereupon by manipulating the clutch 39 the winding drum 37 may be set into motion in a reverse direction to exert pull on the cable 35 thereby closing the jaws of the grab around the bundled stalks and elevating the grab and stalks toward the free end of the boom. The shaft 63 is then set into motion to cause the mast 25 to rotate into the position illustrated in Figure 2, whereupon the cable 35 may be unwound from the drum 37, thus lowering the bundled material into any suitable vehicle. The stops 71 and 82 engage the lever 72 to shift the clutch 64 and limit the lateral swing of the boom. Upon again energizing the shaft 66 the boom may be returned to original position over the scoop with the jaws of the grab 40 open ready for a repeat operation. The cycle may be repeated until all the stalks lying on the ground have been gathered and loaded as desired. By admitting fluid to the cylinder 91 from either end according to the position desired, the elevation at which the scoop 87 operates may be regulated and by turning the crank handle 100 its angle of attack on the group of stalks may be regulated.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. In a stalk loader of the type which includes a support carrying a stalk gathering scoop, a boom mounted on the support adjacent the scoop to swing about a vertical and a horizontal axis and a grab suspended from the boom for vertical movement relative thereto, a vertically disposed mast movable with the boom about the vertical axis, and spaced parallel extensible rods pivotally supported atop the mast and coupled to the grab for holding said grab against side sway, and stops on the rods to restrict the extensibility thereof and the travel of the grab from the pivotal connection of the rods to the mast.

2. In a stalk loader of the type which includes a support and a boom mounted thereon to swing about a vertical and a horizontal axis, a grab suspended from the boom for vertical movement relative thereto and a stalk gathering scoop carried by the support from which stalks are removed by the grab, a vertically disposed mast movable with the boom about its vertical axis, a bearing plate carried by the upper end of the mast, a tubular guide pivotally supported on each side of the bearing plate to swing in a vertical arc about an axis which extends across the axis of the mast, a guide rod slidable through each tubular guide, each guide rod being pivoted adjacent one end to the pivotal junction of the lever arms on its respective side of the grab and stops adjacent the ends of the guide rods remote from the grab for engagement with the tubular guides to limit movement of the grab away from the stalk gathering scoop as it descends to embrace stalks gathered by the scoop.

3. A loader comprising a movable support, a scoop carried by the support, a boom pivotally mounted on the support for vertical swinging movement, a grab suspended by flexible means from the boom for vertical movement relative thereto, and means for limiting the maximum displacement of the grab from the boom to an arced path intersecting the scoop when the boom is in the vertical plane of the scoop, said last means comprising extensible members connecting the support and the grab, and means limiting the extension of said members.

4. A loader comprising a movable support, a scoop carried by the support, a boom pivotally mounted on the support for vertical swinging movement, a grab suspended by flexible means from the boom for vertical movement relative thereto, and means independent of the boom position for limiting the maximum displacement of the grab from the boom to an arced path intersecting the scoop when the boom is in the vertical plane of the scoop, said last means being retractable and connecting the support to the grab, said last means comprising a mast on said support and extending a substantial height above the scoop, telescoping members pivotally connected to the mast adjacent the top thereof for vertical swinging movement and also secured to the grab, and means limiting expanding telescopic movement of the members.

5. A loader comprising a movable support and a scoop carried thereby, a boom pivotally mounted on the support for vertical swinging movement, means for swinging the boom about a vertical axis, a grab suspended by flexible means from the boom for vertical movement relative thereto, and a common means for maintaining the grab in the same vertical plane as the boom and for directing the grab to the scoop when the boom is in the vertical plane of the scoop, said common means comprising vertical mast carried by the support and which is mounted to swing about the vertical axis in unison with the boom, a sleeve fixed to the mast for swinging movement therewith and being pivotally mounted to the top of the mast for vertical swinging movement, a rod slidably extending through the sleeve and having one end connected to the grab and the other end engaging the sleeve when the grab is in position to remove material from the scoop.

6. In a loading machine, a carriage having a scoop at its forward end, a boom pivotally secured to the carriage for vertical swinging movement and projecting above and forwardly of the scoop, a grab suspended by flexible means from the boom at a position forward of the scoop, a vertical mast on the carriage to the rear of the scoop, telescoping means connecting the mast and the grab, said means being pivotally connected to the mast adjacent the top thereof for vertical swinging movement, and means positively limiting the extension of said last means to a length substantially equal to the distance from the pivotal connection thereof to the scoop.

FRUMENCE WAGUESPACK.

REFERENCES CITED

The following references are of record in the file of this patent:

UNITED STATES PATENTS

| Number | Name | Date |
| --- | --- | --- |
| 153,272 | Osgood | July 21, 1874 |
| 716,250 | Kolsbun | Dec. 16, 1902 |
| 790,826 | Goetz | May 23, 1905 |
| 829,833 | Bergeron | Aug. 28, 1906 |
| 1,327,324 | Hecker | Jan. 6, 1920 |
| 1,545,664 | Kassebeer | July 14, 1925 |
| 2,375,205 | Barras | May 8, 1945 |
| 2,420,163 | Borsini | May 6, 1947 |
| 2,440,199 | Huston | Apr. 20, 1948 |